Nov. 10, 1964  AKIMOTO SOGABE  3,156,136
REDUCTION GEAR BOX
Filed March 28, 1962

INVENTOR.
Akimoto Sogabe
BY
E. M. Squire
ATTORNEY

United States Patent Office 3,156,136
Patented Nov. 10, 1964

3,156,136
REDUCTION GEAR BOX
Akimoto Sogabe, 2163 Kawashima-cho, Hodogaya, Yokohama, Japan
Filed Mar. 28, 1962, Ser. No. 183,237
3 Claims. (Cl. 74—802)

This invention relates to reduction gear boxes, and more particularly to those utilizing spur gears only for obtaining a large reduction ratio.

The main object of the present invention is to provide a reduction gear box adapted for obtaining a slightly lower rotating speed of a driven shaft than a driving shaft by use of spur gears only, thus enabling easy mass production by avoiding the use of internally toothed ring gears, whereby the outside dimensions or size of the gear box is minimized.

Various objects and advantages of the present invention will be made clear from the following detailed description with reference to the accompanying drawings showing an embodiment of the invention, in which FIG. 1 is an end view of the reduction gear box, one side wall of the casing being broken away;

Figure 1:
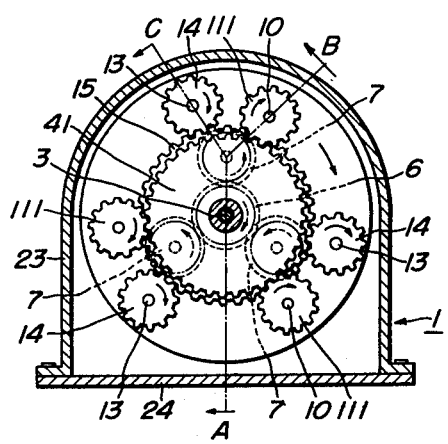

Referring to the drawings, the reduction gear box comprises a casing 1 comprising a pair of vertical end walls 21 and 22 connected together by an arcuate top-and-side wall 23, and a removable bottom plate 24. The side walls 21 and 22 are formed with inner central bosses 25 and 26, respectively, in which suitable journal bearings, not shown, are provided in axial alignment, and a driving shaft 2 and a driven shaft 3 are supported for rotation along a common axial line in the journal bearings, respectively.

Stationary spur gears 4 and 41 of same diameters and numbers of teeth are mounted on central bosses 25 and 26, respectively, extending parallel to and spaced from the vertical walls 21 and 22, being suitably fixed to the bosses. The driving shaft 2 carries a pair of vertical carrier discs 5 and 5 through suitable bearing means, not shown. The carrier discs 5, 5 are freely revolubly mounted on the driving shaft 2, and are prevented from axial displacement by suitable and convenient means, not shown.

The driving shaft 2 carries a driving spur gear 6 fixedly mounted thereon between the pair of carrier discs 5, 5. The pair of discs 5, 5 carries three freely revoluble horizontal shafts 8. The three shafts 8 are equally angularly spaced from one another, and respectively carry spur gears 7 of equal diameters and fixed thereto, each of which meshes with the driving gear 6.

The pair of carrier discs 5, 5 also carry three horizontal rotational shafts 10 through bearing means, not shown, near but radially outside respective shafts 8. Each shaft 10 carries a spur gear 9 fixed thereto and meshing with adjacent gear 7. The gears 9 have diameters and consequently numbers of teeth equal to those of the driving gear 6. Each shaft 10 extends beyond discs 5, 5, and carries at opposite ends spur gears 11 and 111 fixed thereto, respectively, which gears mesh with stationary gears 4 and 41, respectively.

Figure 2:
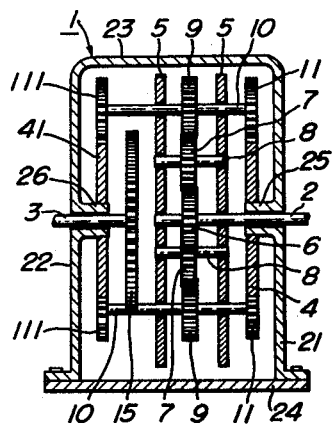
FIG. 2 is a diagrammatic and longitudinal sectional view taken substantially along line A—B in FIG. 1.
Figure 4:
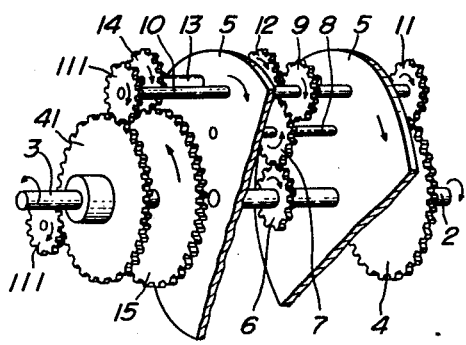
FIG. 4 is a diagrammatic perspective view of the gearing, partly broken away to illustrate details of construction.
Figure 3:
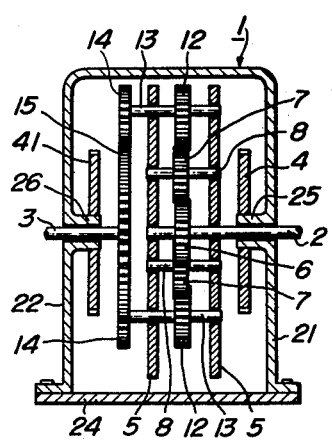
FIG. 3 is a similar sectional view taken substantially along line A—C in FIG. 1.

The pair of carrier discs 5, 5 further carry another set of three horizontal shafts 13 freely revolubly mounted therein. Each shaft 13 extends near each corresponding shaft 10 and carries a spur gear 12 meshing with each corresponding gear 7. Each gear 12 has a diameter and a number of teeth equal to those of the gear 9. Each shaft 13 extends to the left in FIGS. 2 and 3, that is, towards the driven-shaft side and carries a spur gear 14 fixed thereto. Each gear 14 meshes with a spur gear 15 fixedly mounted on the inner end of the driven shaft 3. The gear 15 has a diameter slightly larger than that of the stationary gears 4 and 41.

With the above-described arrangement of spur gears and associated elements, when the driving shaft 2 rotates, the planetary gears 7, 9, 12, 11, 111 and 14 are rotated about their own axes, and also revolve about the common axis of the shaft 2 and 3 by virtue of the rotation of carrier discs 5, 5. The carrier discs 5, 5 are driven in the same rotating direction of the driving shaft 2 with the revolution of gears 11 and 111 which mesh with the stationary gears 4 and 41. The driven shaft 3 is rotated through the gear 15 meshing with the planetary gears 14, and it will readily be understood that the rotation of the driven gear 15 is delayed by the number of teeth in excess of that of the stationary gears 4 and 41 which have slightly smaller diameters and consequently smaller numbers of teeth than the gear 15, and consequently the driven shaft is rotated at a speed slightly lower than that of the driving shaft.

I claim:

1. A reduction gear box comprising a casing 1 having spaced end walls, a driving and a driven shaft 2 and 3 mounted in axial alignment in said end walls for free rotation therein, a pair of stationary spur gears 4 and 41 mounted in said casing adjacent to said end walls concentrically with said aligned shafts, a pair of axially spaced carrier discs 5, 5 freely revolubly mounted on said driving shaft 2, a driving spur gear 6 fixedly mounted on said driving shaft between said pair of carrier discs, a plurality of first spur gears 9 disposed around said driving gear 6 to be driven thereby, said first spur gears 9 being mounted individually on first shafts 10 freely revolubly carried by said carrier discs, a pair of second spur gears 11 and 111 of equal diameters fixedly mounted on each of said first shafts 10 at opposite ends thereof and continuously meshing with said stationary gears 4 and 41, respectively, a plurality of third spur gears 12 disposed around said driving gear 6 to be driven thereby and having respective second shafts 13 rotatively carried by said carrier discs, a fourth spur gear 14 fixedly mounted on each of said second shafts 13 at the side where said driven shaft 3 extends, and a driven spur gear 15 fixedly mounted on said driven shaft and meshing with all of said fourth spur gears 14, said driven gear 15 having a pitch circle diameter slightly larger than the pitch circle diameter of said stationary gears, said stationary spur gears, said second spur gears and driven spur gear having the same tooth pitch.

2. The reduction gear box according to claim 1, wherein said first spur gears 9 and second spur gears 12 have pitch circle diameters and numbers of teeth equal to those of said driving gear 6.

3. The reduction gear according to claim 1, additionally comprising a plurality of intermediate idler spur gears 7 meshing with said driving gear 6 and said first and third spur gears 9 and 12, respectively.

References Cited in the file of this patent
UNITED STATES PATENTS
1,223,259    Cottam _____ Apr. 17, 1917